(12) United States Patent
Verdier

(10) Patent No.: US 8,782,867 B2
(45) Date of Patent: Jul. 22, 2014

(54) ASSEMBLY DEVICE PROVIDED WITH A VISUAL REFERENCE MARK AND METHOD FOR THE ASSEMBLY THEREOF

(75) Inventor: Florent Verdier, Rueil-Malmaison (FR)

(73) Assignee: Lisi Aerospace (FR)

( * ) Notice: Subject to any disclaimer, the term of this patent is extended or adjusted under 35 U.S.C. 154(b) by 180 days.

(21) Appl. No.: 13/508,039

(22) PCT Filed: Nov. 9, 2010

(86) PCT No.: PCT/FR2010/000744
§ 371 (c)(1),
(2), (4) Date: May 3, 2012

(87) PCT Pub. No.: WO2011/055044
PCT Pub. Date: May 12, 2011

(65) Prior Publication Data
US 2012/0222278 A1    Sep. 6, 2012

(30) Foreign Application Priority Data

Nov. 9, 2009    (FR) ...................................... 09 57911

(51) Int. Cl.
*B23Q 17/00*    (2006.01)
*F16B 31/02*    (2006.01)
(52) U.S. Cl.
USPC ............. 29/407.1; 29/407.09; 29/407.01; 411/13; 411/14; 33/613; 33/679.1
(58) Field of Classification Search
USPC ............. 29/407.01, 407.09, 407.1; 33/613, 33/679.1, 542, 836; 411/13, 14
See application file for complete search history.

(56) References Cited

U.S. PATENT DOCUMENTS

| 2,295,783 | A | * | 9/1942 | Greenleaf ..................... 33/679.1 |
| 3,915,053 | A |   | 10/1975 | Ruhl |
| 4,237,612 | A | * | 12/1980 | Christian et al. ................ 33/784 |
| 4,876,800 | A | * | 10/1989 | Pekar et al. ..................... 33/784 |
| 5,039,265 | A |   | 8/1991 | Rath et al. |
| 5,282,707 | A | * | 2/1994 | Palm ................................ 411/3 |
| 6,131,302 | A | * | 10/2000 | Hohmann et al. .............. 33/833 |

(Continued)

FOREIGN PATENT DOCUMENTS

DE    10203133    10/2003

OTHER PUBLICATIONS

WIPO, Rapport de Recherche Internationale, PCT/FR2010/000744, Feb. 21, 2011, and English Translation.

*Primary Examiner* — Essama Omgba
(74) *Attorney, Agent, or Firm* — Henricks, Slavin & Holmes LLP

(57) ABSTRACT

A device (1; 20; 51) for assembling pre-bored (15) elements (2; 3), the elements together having a reference thickness (18) that may vary up to an actual maximum thickness (40), may include
a male element (4; 21; 52) having a shank (6; 22; 54) extending in a thread (11; 27) or swaging grooves (59),
an external surface (12; 28; 60) having a height (13; 61) equal to a height (14) of the shank, chosen so as to correspond to at least the actual maximum thickness (40) of the elements to be assembled,
wherein the external surface has a visual reference mark (16; 35; 63), located at a distance (17) of a lower limit (9; 34; 57), or extending over a distance (17) from a lower limit up to an upper limit (42A; 42B; 65) toward the head.

15 Claims, 2 Drawing Sheets

(56) References Cited

U.S. PATENT DOCUMENTS

| | | | |
|---|---|---|---|
| 6,508,012 B2 * | 1/2003 | Wells, Jr. | 33/784 |
| 6,827,345 B2 * | 12/2004 | Anderson et al. | 269/49 |
| 7,596,846 B2 * | 10/2009 | Hoeckelman | 29/407.1 |
| 8,220,176 B2 * | 7/2012 | Loisel et al. | 33/613 |
| 2010/0325908 A1 * | 12/2010 | Loisel et al. | 33/613 |
| 2011/0048182 A1 * | 3/2011 | Goss et al. | 81/478 |
| 2012/0266422 A1 * | 10/2012 | Galota et al. | 24/569 |
| 2013/0129441 A1 * | 5/2013 | Goss et al. | 411/8 |

* cited by examiner

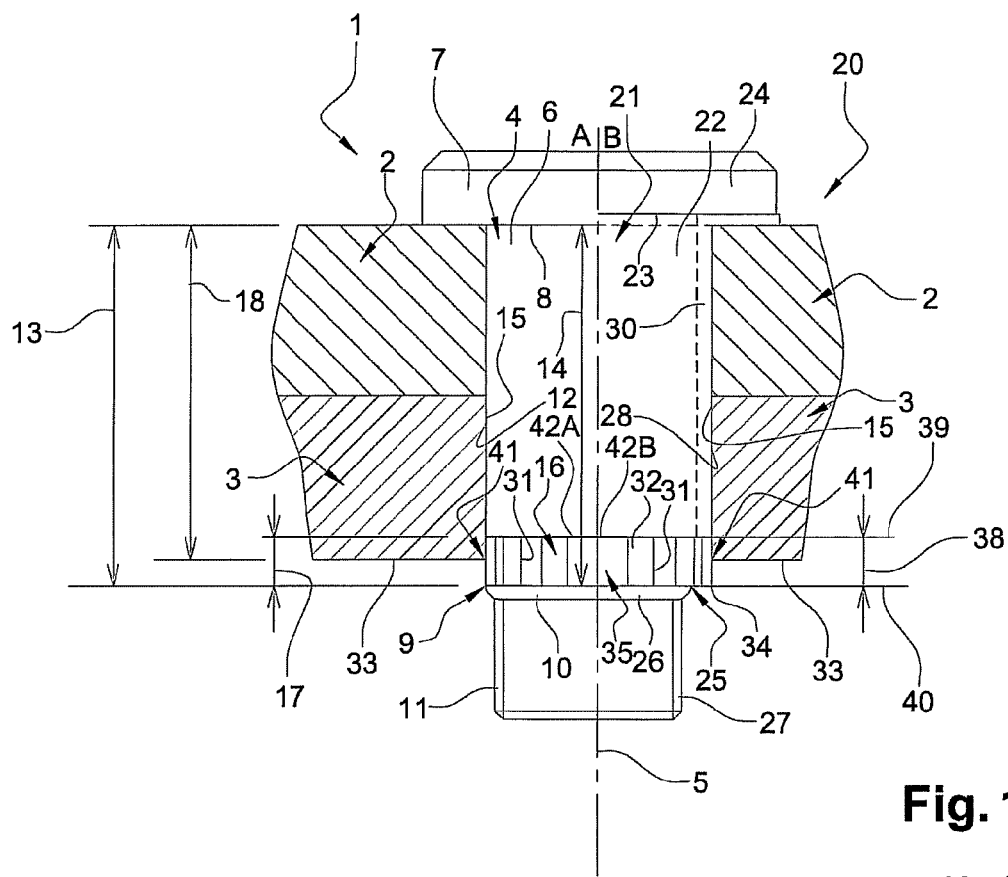
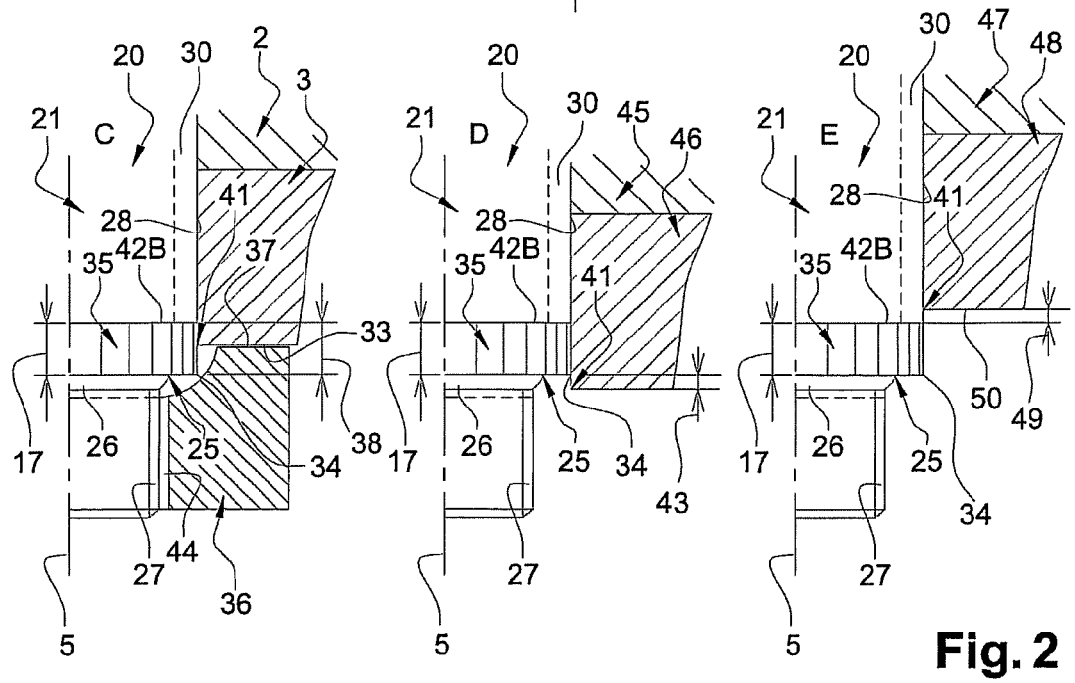
Fig. 1
Fig. 2

ASSEMBLY DEVICE PROVIDED WITH A VISUAL REFERENCE MARK AND METHOD FOR THE ASSEMBLY THEREOF

CROSS REFERENCE TO RELATED APPLICATIONS

This application is a National Stage of International Application No. PCT/FR2010/000744, filed Nov. 9, 2010, which claims priority to application FR0957911 filed Nov. 9, 2009.

TECHNICAL FIELD OF THE INVENTION

This invention relates to an assembly device provided with a visual reference mark. The technical field of the invention is, generally, that of fasteners. More specifically, the invention relates to screws, nuts, swaging grooves fasteners, swage collars, and sleeves intended to fasten structural elements of a device, such as pre-bored aircraft elements.

TECHNOLOGICAL BACKGROUND OF THE INVENTION

In the prior art, when mounting assembly devices on a structure, the operator must, in a first operation, measure the actual thickness of the structure to be assembled to select a fastening device with an appropriate length because a difference may exist between a theoretical reference thickness, known by the operator, and an actual thickness, this difference being due to varying manufacturing tolerances that exist in the area of the assembly, specifically in the thickness of the structural elements.

In practice, however, because it is difficult and tedious to measure this thickness, the result is approximate or even incorrect. Additionally, the assembly of the assembly device itself can cause
- compression of the elements to be assembled at the location where the assembly device is mounted due to a lack of hardness of an interposed mastic applied between said elements;
- an elongation of said device in response to the exerted force, from one side, by a head of said device and, from the other side, by either a nut or a swage collar.

All of these inaccuracies can easily result in an incorrect selection regarding the length of assembly device and cause a device to be assembled with a wrong length.

In the prior art, to simplify the selection of a device to use for the assembly, an acceptable grip range is defined for each device. For a given theoretical reference thickness, this range is the difference between the actual minimum thickness and the actual maximum thickness of a structure that can be assembled with a given device, i.e. the potential thickness variation range of all elements in the structure. Typically, this grip range is about one or two-sixteenths of an inch. A family of assembly devices therefore comprises several devices of different lengths, the difference in length separating them generally being the grip range, except on an overlap range.

After the assembly of the assembly device selected by the operator, typically a screw or a swage groove fastener, the operator verifies his selection after tightening a bolt or a swage collar on the fastener grooves. There are then four possible outcomes:
- the screw does not protrude from the nut, indicating that the assembly device is much too short, in which case it must be completely replaced;
- the length of the device seems to be correct to the person who installed it, in which case he does not replace it, even though it is actually a few tenths of a millimeter too short, representing a serious risk in terms of shearing the threads or the swage collar, or loosening the nut;
- the tightened nut or swage collar is not at all seated against the structure, indicating that the device is much too long, in which case it must be completely replaced;
- the length of the device seems to be correct to the person who installed it, in which case he does not replace the assembly device, even though it is actually too long, i.e. the tightened nut is not seated against the structure but rather abuts one end of the threading of the device, such that the assembly device does not apply any clamping force onto the structure to be assembled.

If the operator realizes his incorrect selection, there is a significant loss of material and time because he must, in a second operation, dismantle the device that can no longer perform its function in most cases and reassemble, in a third operation, as many times as necessary, another specific assembly device, called "oversize".

If he does not realize his incorrect selection, this mistake has serious consequences for the strength of the structure being assembled.

The method for determining the device length in the prior art is therefore long, tedious, inaccurate, costly, and dangerous.

GENERAL DESCRIPTION OF THE INVENTION

The invention proposes to resolve all of the technical problems associated with selecting a device of an appropriate length.

To prevent errors related to the selection of the assembly device length, the invention suggests providing them with a visual reference mark at the end opposite their head. More specifically, for a screw without a sleeve for example, the visual reference mark is arranged on the shank of the screw, near its threads. For a screw with sleeve, the visual reference mark is arranged at the lower end of the sleeve, on its external surface.

According to the invention, in both cases,
- the visual reference mark is provided at a distance of the lower limit within the acceptable grip range for the assembly device on which it is provided, i.e. at the potential thickness variation for the structure being assembled, or
- the visual reference mark covers a distance of more than this grip range.

Thus, after a first operation of inserting an assembly device according to the invention, having a length equal to the theoretical reference thickness of the elements to be assembled, known by the operator, before any tightening of the nut or any installation of the swage collar, the operator performs a quick visual check, in a second operation, that the length of the chosen device is appropriate. Specifically, he looks at the position of the surface of the element to be assembled on the threaded side relative to the visual reference mark in order to validate or reject his device size selection.

The invention therefore has many advantages. It specifically allows the operator to save time because he no longer has to perform two operations consisting of measuring the actual thickness of the elements to be attached and tightening the nut to verify his device thickness selection. No means for a gauge or calibration type control measurement is now necessarily. Also, because assembly devices that have already been installed are not reused in aircraft assemblies, rejected ones are thrown away in the prior art, representing a significant waste that the invention now proposes to prevent. Finally, the device selection according to the invention is certain and reliable.

The invention therefore relates to a device for assembling pre-bored elements, the elements together having a reference thickness that may vary within a predetermined range between an actual minimum thickness and an actual maximum thickness, the device comprising a male element extending along an axis and comprising a shank that extends to a first end, in a head, and to a second end, via a shoulder, in a thread or in swaging grooves, an external surface intended to be in contact with the bore, having a height equal to a height of the shank, chosen so as to correspond to at least an actual maximum thickness of the elements to be assembled, and including a grip range selected to be at least equal to the predetermined range, characterized in that the external surface has a visual reference mark located at a distance from a lower limit, or extending over a distance from a lower limit to an upper limit toward the head, said distance corresponding to the maximum of the grip range of the device.

The invention also relates to a method for assembling pre-bored elements, the elements together having a reference thickness that may vary within a predetermined range between an actual minimum thickness and an actual maximum thickness, in which an assembly device is fully inserted into the bore, the device comprising a male element extending along an axis and comprising a shank that extends to a first end, in a head, and to a second end, via a shoulder, in a thread or in swaging grooves, an external surface intended to be in contact with the bore, having a height equal to a height of the shank, chosen so as to correspond to at least an actual maximum thickness of the elements to be assembled, and including a grip range selected to be at least equal to the predetermined range, characterized in that an edge, formed by a circular intersection between the bore and the internal surface, is visually verified as being both above a lower limit of the external surface, and below a visual reference mark or an upper limit of said reference mark, said reference mark being provided on an external surface and located at a distance from the lower limit or extending over a distance from the lower limit toward the head to an upper limit, the distance corresponding to the grip range of the device.

The invention and its various applications will be better understood upon reading the following description and studying the figures that accompany it.

BRIEF DESCRIPTION OF THE DRAWINGS

They are presented for illustrative purposes only and are not limiting to the invention. The figures show:

FIG. 1: a schematic representation of a side view of a first example and a second example of assembly devices according to the invention;

FIG. 2: a schematic representation of a side view of the second example of an assembly device according to the invention in three separate assembly positions;

In these drawings, identical elements maintain the same reference numbers.

DETAILED DESCRIPTION OF PREFERRED EMBODIMENTS OF THE INVENTION

Figure 3:
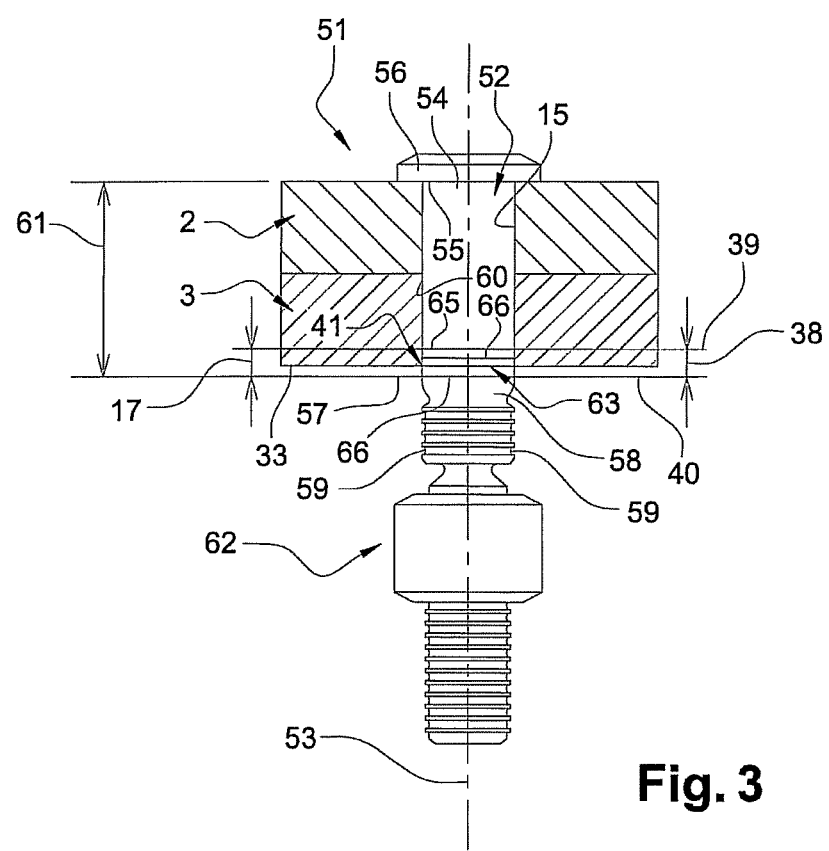
FIG. 3: a schematic representation of a side view of a third example of an assembly device according to the invention.

FIG. 1 shows, schematically, the left side A of an axis of symmetry 5 passing through its center, a side view of a first example of a device 1 for assembling two elements 2 and 3, and the right side B of this axis 5, a side view of a second example of a device 20 for assembling the same elements 2 and 3. In an example, the elements to be assembled 2 and 3 consist of an aircraft structure and together have a total reference thickness 18 that may vary between an actual minimum thickness and an actual maximum thickness 40. In addition, the operator's measurement of this actual thickness is difficult and approximate. The potential variation in actual thickness of the structural elements is due to various inaccuracies relating to the assembly. Among these structural inaccuracies, we can specifically list a manufacturing thickness tolerance of elements 2 and 3, compression of one the elements 2 and 3 to be assembled at the location where the assembly device 1 is mounted due to a lack of hardness of an interposed mastic, not shown, applied between said elements.

This potential variation in structural thickness is delimited by a predetermined thickness variation range 38 known by the operator and corresponding to an acceptable grip range for the selected assembly device 1. A bore 15 is premade in each element 2 and 3.

In addition, an elongation, of a few tenths of a millimeter, of the assembly device can be produced in response to the exerted force, from one side, by a head 7 of said device and, from the other side, by a nut.

The assembly device 1 comprises a male element, such as a screw 4 extending along the axis 5 and comprising a shank 6 extending, to a first end 8, in the head 7, and to a second end 9, via a shoulder 10, in a thread 11. In one embodiment, such as the one described in FIG. 3, the shank extends, at the second end, in swaging grooves. The shank 6 has an external surface 12 with a height 14, the surface 12 being intended to be in contact with the bore 15. The height 14 of the shank 6 is defined, for the assembly of elements with a given total reference thickness 18, as being equal to at least the actual maximum thickness 40 of the elements to be assembled. The height 14 may therefore be equal to or slightly higher than the actual maximum thickness 40 in order to include, for example, a manufacturing tolerance. For a male element like a screw 4, the device 1 can accept a nut, shown in FIG. 2C, capable of being tightened around the threads 11 until it is supported against a bottom surface 33 of the lower element 3. In the previously described situation of a male element having swaging grooves, the device according to the invention can accept a swage collar capable of being swaged on the grooves until it is supported against the elements to be assembled. In the example, the device 1 does not include a sleeve. According to the invention, the external surface 12 of the shank 6 has a visual reference mark 16 extending from the second end 9, called the lower limit, toward the head 7. The visual reference mark 16 extends over a distance 17 measured along the axis 5. This distance 17 corresponds to the maximum of the grip range that is acceptable for the assembly device 1, i.e. the maximum of at least the potential thickness variation range for the elements 2 and 3, up to an upper limit 42A. That is, if the height 14 of the shank 6 is defined as being equal to the actual maximum thickness 40 of the elements to be assembled, then the grip range is the potential thickness variation range 38 for the elements 2 and 3. If the height 14 of the shank 6 is defined as being greater than the actual maximum thickness 40, the grip range is the difference between height of the shank 6 and the actual minimum thickness 39 of the elements to be assembled.

In an example, the distance 17 over which the visual reference mark extends is 90% of the grip range that is acceptable for the assembly device 1. Thus, according to the invention, even if the value of the distance 17 is accurate to only about 10%, it will not exceed the maximum value of the grip range. This 10% also covers inaccuracies related to the operator's visual assessment and even accounts for elongation under device load.

The lower limit of the visual reference mark 16 takes the form of the start of the shoulder 10.

The assembly device 20 comprises a screw 21 extending along the axis 5 and comprising a shank 22 extending, to a first end 23, in the head 24, and to a second end 25, via a shoulder 26, in a thread 27. The device 20 can accept a nut, not shown, capable of being tightened around the thread 27 until it is supported against the bottom surface 33 of the lower element 3. The device 20 finally comprises a sleeve 30 capable of accepting the shank 22 of the screw 21 within it. The sleeve 30 has an external surface 28 with a height 13 equal to a height 14 of the shank 22 of the screw 21, the surface 28 being intended to be in contact with the bore 15. The height 14 of the shank 22 is defined, for the assembly of elements with a given total reference thickness 18, as being equal to at least the actual maximum thickness 40 of the elements to be assembled. The height 14 may therefore be equal to or slightly higher than the actual maximum thickness 40 in order to include a manufacturing tolerance, for example. According to the invention, the external surface 28 of the sleeve 30 has a visual reference mark 35 extending from its lower end 34, called a lower limit, toward the head 24 over a distance 17 corresponding to the maximum of the grip range that is acceptable for the assembly device 1, i.e. the maximum of at least the potential thickness variation range 38 for the elements 2 and 3, up to an upper limit 42B.

In the example, the visual reference marks 16 and 35, called visual reference marks of thickness, have many axial grooves 31. In the example, the visual reference marks 16 and 35 have twenty-four axial grooves 31.

In a preferred embodiment shown in FIG. 3, the visual reference mark has at least
a circular groove at few micrometers thick and/or as deep as its upper limit, or
a circular paint line a few micrometers thick.

The visual reference mark 35 for the device 20 has a coating 32 of a color that is different than the color of the external surface 28 and/or different than the color of the bottom surface 33 of the element 3 located on the side where the nut is tightened.

In one example, the color is bright, preferably fluorescent.
In one example, the coating is paint.
In one embodiment, the visual reference mark according to the invention has a laser or chemical or mechanical marking that alters the surface state of the external surface.

The two devices 1 and 20 correspond to a good length selection, appropriate for the actual thickness of the elements 2 and 3 to be assembled. In fact, the visual reference marks 16 and 35 are visible by the operator without fully protruding from the lower element 3. More specifically, an edge 41, formed by a circular intersection between the bore 15 and the bottom surface 33, is in contact with said reference marks.

FIG. 2 schematically shows a side view of the second example of an assembly device 20 according to the invention in three separate assembly positions C, D, and E.

The method for assembling pre-bored elements according to the invention comprise steps in which
the assembly device 20 is fully inserted into the bore 15, then
it is visually checked that the edge 41 is next to, preferably in contact with, the visual reference mark 35 provided on the external surface of said device, and finally
the nut 36 is tightened around the male element 21 or the collar is swaged on the grooves until the nut or the collar is supported against the bottom surface 33 of the elements 2 and 3 to be assembled.

Position C, the same as in FIG. 1, is a good selection for a device 20, appropriate for the actual thickness of the elements 2 and 3 to be assembled. The visual reference mark 35 is visible without fully protruding from the lower element 3. More specifically, the edge 41 is in contact with the visual reference mark 35. In such a position, the operator can fully tighten the nut 36 and observe that a top surface 37 of said nut is supported against the bottom surface 33 of the element 3 and that all the threads 44 of the nut 36 are engaged with threads 27 of the screw 21, ensuring that the device 20 and the bore 15 will hold together well over time.

Position D is a bad selection for a device 20, since it is inappropriate for the actual thickness of the elements 45 and 46 to be assembled. In fact, the visual reference mark 35 is hidden from the operator because it does not protrude at all from the inner element 46. More specifically, the lower end 34 of the internal surface 28 of the sleeve 30 is in contact with the bore 15, at a distance 43, of around a few tenths of a millimeter, from the edge 41. Also, because full contact between the bore 15 and the internal surface 28 is not ensured, if a nut were tightened around the screw 21, not all of the nut's threads would be engaged with the threads 27 of said screw, which represents a significant risk in terms of shearing the threading 27 of the screw 21 and/or loosening the nut. The operator must therefore simply remove the device 20, which can be saved for future use, and select a longer device.

Position E is also a bad selection for a device 20, since it is inappropriate for the actual thickness of the elements 47 and 48 to be assembled. The visual reference mark 35 is visible, but it fully protrudes from the lower element 48. More specifically, the lower limit 42B of the visual reference mark 35 is not in contact with the bore 15; it is at a distance 49, of around a few tenths of a millimeter, from the edge 41. If a nut were tightened around the screw 21, the top surface of the nut would not be in contact with a bottom surface 50 of the element 49, representing a significant risk of poorly holding the assembly together and damaging the bore 15. The operator must therefore simply remove the device 20, which can be saved for future use, and select a shorter device.

FIG. 3 schematically shows a side view of a third example of a device 51, according to the invention, for assembling the same two elements 2 and 3 described above.

The assembly device 51 comprises a male element, such as a pin 52 extending along the axis 53 and comprising a shank 54 extending, to a first end 55, in the head 56, and to a second end 57, via a shoulder 58, in swaging grooves 59. The shank 54 has an external surface 60 with a height 61, the surface 60 being intended to be in contact with the bore 15. The height 61 of the shank 54 is defined, for the assembly of elements with a given total reference thickness, as being equal to at least the actual maximum thickness 40 of the elements to be assembled. The height 61 may therefore be equal to or slightly higher than the actual maximum thickness 40 in order to include a manufacturing tolerance, for example. The device 51 can accept, for example, a swage collar 62 capable of being swaged, by means of a swaging tool not shown, onto the grooves 59 until it is supported against the bottom surface 33 of the inner element 3. According to the invention, the external surface 60 of the shank 54 of the pin 52 has a visual reference mark 63 extending from the lower end 57 to the head 56 over a distance 17 measured along the axis 53. At a maximum, the distance 17 is at least the potential thickness variation range 38, up to an upper limit 65. As in the example shown in FIG. 1, if the height 61 of the shank 54 is defined as being greater than the actual maximum thickness 40, the grip range is the difference between height of the shank 54 and the actual minimum thickness 39 of the elements to be assembled. The grip range thus includes the predefined range 38 and an additional amount, such as a manufacturing tolerance.

In the example, according to the invention, the visual reference mark 63, called a visual reference mark of thickness, has five circular grooves 66 a few micrometers thick and/or as deep as between the upper limit 65 and the second end 57 of the shank 54.

In a first embodiment of the invention, the visual reference mark has only one circular marking at its upper limit 65.

In a second embodiment of the invention, the visual reference mark has a first circular marking on the shank and a second marking on the second end of the shank.

The device 51 is a good length selection, appropriate for the actual thickness of the elements 2 and 3 to be assembled because the visual reference mark 63 is visible by the operator without fully protruding from the lower element 3.

More specifically, an edge 41, formed by the circular intersection between the bore 15 and the bottom surface 33, is in contact with the reference mark.

Alternatively, the device 61 may further comprise a sleeve on which a visual reference mark is provided. Preferably, this visual reference mark is configured in the same manner as the sleeve 30 shown in FIGS. 1 and 2.

A method for assembling the elements (2, 3) using the device 51, alone or with a sleeve, comprises a step for selecting the size of said device 51. This step is similar to the step described above for devices 1 and 20 (FIG. 2) and similarly involves the visual reference marks of the rod 52 and/or any sleeve.

After an appropriate selection of a device 51 based on the actual thickness of the elements (2, 3) to be assembled, a step to swage the collar 62 into the grooves 59 is carried out. An assembly is correct when a top surface of the collar is supported against the bottom surface 33 of the element 3 to be assembled.

The invention claimed is:

1. A method for assembling pre-bored elements by an assembly device,
    the elements together having a reference thickness that may vary within a predetermined range between an actual minimum thickness and an actual maximum thickness, the device comprising
    a male element extending along an axis and comprising a shank extending, at a first end, in a head, and at a second end, via a shoulder, in a thread or swaging grooves,
    an external surface intended to be in contact with a bore, having a height equal to a height of the shank, chosen so as to correspond to at least the actual maximum thickness of the elements to be assembled, and including a grip range selected to be at least equal to the predetermined range,
    said external surface having a visual reference mark, said reference mark being located at a distance of a lower limit, or extending over a distance from a lower limit up to an upper limit toward the head, said distance being, at a maximum, the grip range of the device,
    said method comprising the following steps:
    fully inserting the assembly device into the bore,
    visually verifying that an edge, formed by a circular intersection between the bore and a bottom surface, is both
    above a lower limit of the external surface, and
    below the visual reference mark or an upper limit of said reference mark.

2. A method according to claim 1, characterized in that the visual reference mark has at least one circular groove and fully inserting into the bore the assembly device with the at least one circular groove.

3. A method according to claim 1, characterized in that
    the external surface is that of the shank of the male element,
    the lower limit of the visual reference mark takes the form of the start of the shoulder, and
    visually verifying the edge is above the start of the shoulder.

4. A method according to claim 1, characterized in that
    it comprises a sleeve capable of accepting the shank of the male element within it,
    the external surface is that of the sleeve,
    the lower limit of the visual reference mark takes the form of a lower end of the sleeve, and
    fully inserting the assembly device into the sleeve and visually verifying the edge is above the lower end of the sleeve.

5. A method according to claim 4, characterized in that the distance of the visual reference mark is 90% of the grip range and including fully inserting the assembly device having the distance of 90% of the grip range into the sleeve.

6. A method according to claim 4, characterized in that the visual reference mark has at least one axial groove and including fully inserting the assembly device having the at least one axial groove into the sleeve.

7. A method according to claim 4, characterized in that the visual reference mark has a coating of a color that is different than the color of the external surface and/or different than the color of the bottom surface of one of the elements located on the side where a nut is tightened or a swage collar is swaged and including fully inserting the assembly device having the coating into the sleeve.

8. A method according to claim 4, characterized in that the coating is a bright color of paint and including fully inserting the assembly device having the bright color coating into the sleeve.

9. A method according to claim 4, characterized in that the visual reference mark has a mechanical, laser, or chemical marking that alters the surface state of the external surface and including fully inserting the assembly device having the marking into the sleeve.

10. A method according to claim 1, characterized in that the distance of the visual reference mark is 90% of the grip range and including fully inserting the assembly device having the distance of 90% of the grip range into the bore.

11. A method according to claim 1, characterized in that the visual reference mark has at least one axial groove and including fully inserting the assembly device having the at least one axial groove into the bore.

12. A method according to claim 1, characterized in that the visual reference mark has a coating of a color that is different than the color of the external surface and/or different than the color of the bottom surface of one of the elements located on the side where a nut is tightened or a swage collar is swaged and including fully inserting the assembly device having the coating into the bore.

13. A method according to claim 12, characterized in that the coating is a bright color of paint and including fully inserting the assembly device having the bright color coating into the bore.

14. A method according to claim 1, characterized in that the visual reference mark has a mechanical, laser, or chemical marking that alters the surface state of the external surface and including fully inserting the assembly device having the marking into the bore.

15. A method according to any one of claims 1 to 2, comprising a further step of tightening a nut on the thread or swaging a swage collar on the swaging grooves.

\* \* \* \* \*